United States Patent [19]

Damon et al.

[11] Patent Number: 4,763,137

[45] Date of Patent: Aug. 9, 1988

[54] TWO PASS THERMAL PRINTING

[75] Inventors: Brian W. Damon; Cary P. Ravitz; Carl J. Voss, all of Lexington, Ky.

[73] Assignee: International Business Machines Corporation, Armonk, N.Y.

[21] Appl. No.: 914,032

[22] Filed: Oct. 1, 1986

[51] Int. Cl.[4] .......................... G01D 15/10; B41J 3/20

[52] U.S. Cl. ................................ 346/76 PH; 400/120

[58] Field of Search ........................ 346/76 PH, 76 R; 400/120, 124

[56] References Cited

U.S. PATENT DOCUMENTS

| | | | |
|---|---|---|---|
| 4,454,516 | 6/1984 | Moriguchi et al. | 346/76 PH |
| 4,467,363 | 8/1984 | Tench | 358/261 |
| 4,567,488 | 1/1986 | Moriguchi et al. | 346/76 PH |
| 4,575,731 | 3/1986 | Horlander | 346/76 PH |
| 4,590,487 | 5/1986 | Noguchi et al. | 346/76 PH |
| 4,616,941 | 10/1986 | Nagai | 400/120 |
| 4,638,329 | 1/1987 | Nakayama et al. | 346/76 PH |
| 4,639,741 | 1/1987 | Inove | 346/76 PH |
| 4,653,940 | 3/1987 | Katsukawa | 400/121 |
| 4,675,700 | 6/1987 | Nagira et al. | 346/76 PH |

FOREIGN PATENT DOCUMENTS

| | | | |
|---|---|---|---|
| 186508 | 7/1986 | European Pat. Off. | 400/120 |
| 2157865 | 10/1985 | United Kingdom | 400/120 |

OTHER PUBLICATIONS

IBM Technical Disclosure Bulletin, entitled "All-Points-Addressable Printing with a Resistive Ribbon", vol. 29, No. 2, Jul. 1986, pp. 609-610.

IBM Technical Disclosure Bulletin entitled: "Enhanced Duty Cycle Prediction and Control for Wire Matrix Printers", B. R. Cavill et al., vol. 24, No. 11A, Apr. 1982, at pp. 5430-5432.

*Primary Examiner*—H. Broome
*Assistant Examiner*—Gerald E. Preston
*Attorney, Agent, or Firm*—John A. Brady

[57] ABSTRACT

Heat accumulation in a thermal printhead is controlled by printing blocks of data along the print line in two passes when examination of the data shows the potential of excessive heating. The proportion of heat intensive or black parts in each block is determined by data processor 17 by examining the data for a line in memory 19. An accumulation is made assigning blocks having high heat density minus 2, blocks having intermediate heat density minus 1 and blocks having low heat density plus 1. When that figure is at minus two the next block is not printed until a second pass and the accumulation is set to zero. Where the accumulation is minus 1, print power is reduced for the next block, which is printed in the first pass. Excessive heat in the printhead results in machine damage and impaired print quality. A second pass is completely avoided where the data is such that this is unnecessary. This offers the potential of feeding ribbon only in blocks being printed, although ribbon feeding may be continued to achieve additional cooling.

16 Claims, 3 Drawing Sheets

FIG. 2

| CURRENT CumRef | PASS | BLOCK STATUS | PRINT POWER | DENSITY OF BLOCK (%) | NEW CumRef |
|---|---|---|---|---|---|
| 0 | 1 | INITIAL BLOCK OR PRIOR BLOCK LOW DENSITY OR PRIOR BLOCK NOT PRINTED | INITIAL | 0–< 45<br>45–< 67<br>67–100 | 0<br>–1<br>–2 |
| –1 | 1 | BLOCK AFTER SINGLE MEDIUM DENSITY BLOCK | REDUCED BY PRESET FROM INITIAL | 0–< 45<br>45–< 67<br>67–100 | 0<br>–2<br>–2 |
| –2 | 1 | BLOCK AFTER HIGH DENSITY BLOCK OR BLOCK AFTER TWO MEDIUM DENSITY BLOCKS | NOT PRINTED IN PASS 1 | 0–100 | 0 |
| – | 2 | BLOCK NOT PRINTED IN PASS 1 | INITIAL | – | – |
| – | 2 | BLOCK PRINTED IN PASS 1 | NOT PRINTED IN PASS 2 | – | – |

TWO PASS THERMAL PRINTING

TECHNICAL FIELD

This invention relates to thermal printing in a printing system in which excessive heat can accumulate in a thermal printhead. In one form of thermal printing heater elements are carried on the printhead to selectively provide the heat for thermal printing. In the form of thermal printing employed in the specific embodiment of this invention, the heat is created in a resistive transfer ribbon, with the printhead carrying electrodes which selectively provide electric current to the resistive ribbon. In systems embodying either of such forms, intensive printing can result in the printhead retaining so much heat as to interfere with printing because the print elements themselves or areas near them are so hot as to cause printing effects whether the print element is selected or not. Also, excessive heat damages the printhead and the ribbon. Such effects from the accumulation of heat must be avoided to protect the printer, as well as the quality of the printing.

BACKGROUND ART

This invention involves the printing of images by more than one complete pass across a line of printing when this is necessary to counter the effects of residual heat in the printhead. Such multiple pass printing to avoid overheating the printhead is known prior to this invention in which a column of print elements is driven in either two or three passes as described in *IBM Technical Disclosure Bulletin* article entitled "All-Points-Addressable Printing With A Resistive Ribbon," Vol. 29, No. 2, July 1986 at pp. 609–610. The article discloses resistive ribbon printing of the kind employed in the preferred embodiment of this invention with a vertical column of 40 electrodes used for printing each line.

To print all-points-addressable graphics in that prior system the 40 electrodes are not driven simultaneously regardless of the content of the data to be printed. Instead, at least two passes of the electrodes are made in the printing of each line, with provision for three passes when the data is particularly heavy in current-intensive, black elements, typically dark or black areas. In the two pass operation, alternating groups of two adjacent electrodes are driven to the extent that the content of the data calls for the driving of those electrodes. The printhead is returned to the start of the line and the line is traversed on a second pass with the remaining groups of two adjacent electrodes driven to the extent that the content of the data calls for the driving of those electrodes. Accordingly, at the end of two passes, each electrode has been driven with the data and at the position on the paper being printed as would have been the case had all 40 electrodes been operated on in a single pass in accordance with the original graphic data to be printed.

The data of the line is examined in continuous segments or blocks. Where such an interval of data is above a given percentage of black content, a three pass mode is entered. In the three pass mode two adjacent electrodes are driven in the first pass to the extent that the content of the data calls for the driving of those electrodes, while the next four electrodes are not driven. The remaining electrodes in the column are driven according to the same pattern of two adjacent electrodes driven and the next four not driven. In the second pass, two adjacent electrodes in each group of the four previously not driven are driven to the extent that the content of the data calls for the driving of those electrodes. In the third pass, the remaining two electrodes in each of the groups of six electrodes are driven to the extent that the content of the data calls for the driving of those electrodes. Accordingly, at the end of the three passes, each electrode has been driven with the data and at the position of paper being printed on as would have been the case had all 40 electrodes been operated in one pass in accordance with the original graphic data.

U.S. Pat. No. 4,454,516 to Moriguchi et al discloses a thermal printing system in which thermal printing in one line is carried out in one or more operations dependent upon the amount of printing called for by the data. U.S. Pat. No. 4,567,488 to Moriguchi et al is a prior teaching of general interest in that it is illustrative of a thermal printing system in which the content of data defining printing near an element to be driven, including both before and after an element to be driven, is used to define the extent to which the element is driven.

This invention employs the examination of continuous intervals or segments of data in a line with the printing of all data in the interval except where the examination indicates a predetermined concentration of heat-intensive, high density (typically black) elements. At such a concentration, the next interval is not printed until a second pass. The following interval is normally then printed in full. Thus, each interval is printed using all the electrodes simultaneously to the extent the content of the data calls for driving all of those electrodes; although where the data is sufficiently heat-intensive, some intervals are omitted in the first pass.

DISCLOSURE OF INVENTION

Heat accumulation in a thermal printhead is controlled by printing blocks of data in two passes when examination of the data shows high heat accumulation or implies excessive heating. Since high density black or colored parts of images are typically formed by raising heat in a thermal system, the proportion of black in the image to be printed by such a system defines the heat accumulation, while heat dissipation characteristics from the printhead are relatively fixed.

To control this heat accumulation, all-points-addressable graphic images are stored in bit-for-bit maps and the bit density is obtained by counting the black or heat-intensive bits. In the preferred embodiment, the bits in segments or blocks of six-tenth of an inch (0.6 inch, approximately 1.52 cm) in length along the printing line are summed. Where the images are in the form of characters, the segments are six characters.

Preferably, the character information itself includes the bit density information. The first block of data is printed on the first pass at a predetermined initial print power from the printhead. A power reference is accumulated by incrementing down by 1 the reference for any block having between, for example, 45 percent and less than, for example, 67 percent heat-intensive bits. The power reference is decremented 2 for any block have having a higher proportion of heat-intensive bits. For a block less than, for example, 45 percent heat-intensive bits, the power reference is incremented by 1, but not higher than the initial power reference level. Power for each block after the first or left block in each line is set by the power reference status resulting from the previous blocks. When the power reference is down 2 or more, a second printing pass is specified and the next block is not printed in the first pass. When the power reference is down 1, the next block is printed at a predetermined print power less than the initial print power. When a block is skipped because the two pass mode has been entered, the power reference is reset to the initial value and the next block is printed at initial print power. In the second pass all blocks skipped in the first pass are printed at initial print power as the printer traverses across the same print line a second time (which could be in the reverse direction from the first pass if the printer operates bidirectionally).

A major advantage of the present invention is that a second pass is completely avoided where the data is such that this is unnecessary. Also, the skipped blocks may be large enough to permit withdrawal of the printhead and disablement of ribbon feed in certain systems. Accordingly, although two passes are made, ribbon usage may be nearly the same as for one pass and the skipped blocks may be traversed at the non-printing speed of the system, which normally is higher than the printing speed. Additionally, the full width of a line need not be traversed on the second pass. Changing the print power level as a function of print density minimizes the number of blocks which must be skipped. In a specific system it may be desirable to feed ribbon during skipped blocks to facilitate cooling by moving cool ribbon under the printhead. Also, when the printhead is left on the platen, the platen serves as a heat sink or dissipater. Similarly, in a specific system disabling ribbon feed may be undesirable because initiating ribbon feed at the start of each block printed may cause uneven printing.

BRIEF DESCRIPTION OF DRAWING

The details of this invention will be described in connection with the accompanying drawing, in which

FIG. 2 is an idealized logic or truth table illustrating implementation of this invention;

BEST MODE FOR CARRYING OUT THE INVENTION

Figure 1:
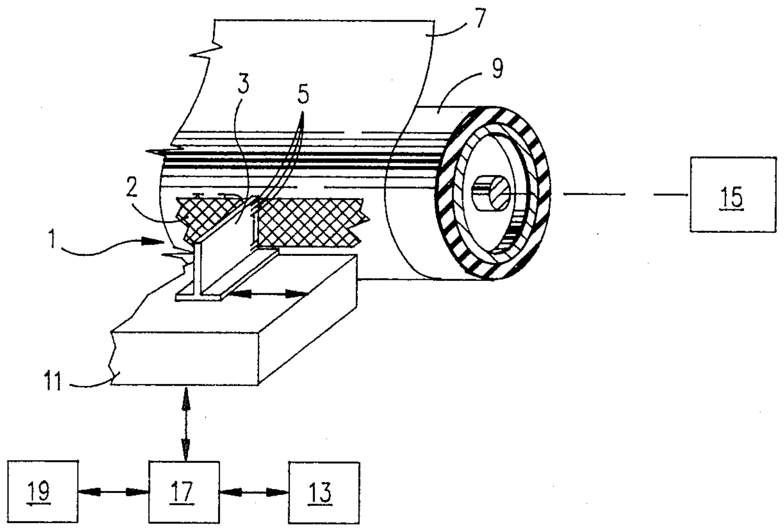
FIG. 1 is illustrative of a printing system employing this invention.

FIG. 1 is illustrative of a printing system employing this invention. The preferred system is a resistive ribbon printer 1 in which a ribbon 2 has a resistive outer layer against which a printhead 3 presses during printing. Printhead 3 supports 40 electrodes 5 in a vertical column which and is perpendicular to a line of printing on paper 7 held on platen 9 between printhead 3 and platen 9. The outer surface of ribbon 2 opposite printhead 3 and adjacent the paper 7, carries a thermal ink which becomes flowable in response to heat created in ribbon 2 by electrical current driven into ribbon 2 by electrodes 5 of printhead 3. Printhead 3 is mounted on carrier 11 and moved across paper 7 parallel to platen 9, as suggested by the arrows on carrier 11. Electrodes 5 are driven or not driven with respect to the position of printhead 3 on paper 7 so as to define selected graphic images or characters. This printing system as just described in known and is described in a number of patents assigned to the assignee of this invention, for example, as the printing system of U.S. Pat. Nos. 4,467,363 to Tench and 4,575,731 to Horlander.

The printing system has a font memory 13, which preferably contains data as described in the foregoing U.S. Pat. No. 4,467,363 to Tench, but which additionally contains for each stored character a separate, four bit code specifying the relative density of black picture elements (pels) or dots to all of the dots in the character. This density is divided linearly into sixteen categories. Thus, for example, a character specifying slightly more than one-half of its pels black would carry an 8, while one having virtually no black would carry a zero. More specifically, the code number for each character density range is essentially as follows: Pel density: 0 to 6 percent, Code 0; Pel density 6–12 percent, Code 1; Pel density 12 to 18 percent, Code 2; Pel density 18 to 24 percent, Code 3; Pel density 24 to 30 percent, Code 4; Pel density 30 to 36 percent, Code 5; Pel density 36 to 42 percent, Code 6; Pel density 42 to 48 percent, Code 7; Pel density 48 to 54 percent, Code 8; Pel density 54 to 60 percent, Code 9; Pel density 60 to 66, Code 10; Pel density 66 to 72 percent, Code 11; Pel density 72 to 78 percent, Code 12; Pel density 78 to 84 percent, Code 13; Pel density 84 to 90 percent; Code 14; and Pel density 90 to 100 percent, Code 15. When the pel density of a character is exactly on a boundary, such as exactly 48, it is assigned the higher code. The information given is necessarily approximate as density information is given only within the sixteen categories. Additionally, although the printing may be done in proportional spacing or reduced in pitch, this is ignored by the density information.

The paper feed system 15 has the capability of feeding paper in increments of the spacing of eight electrodes, which is 1/30 inch (approximately 0.084 cm) in the typical system where forty electrodes cover one line, which is 1/6 inch (approximately 0.42 cm). Such paper feed may be entirely conventional, as by a direct drive from a conventional stepper motor. The system is controlled by a central data processor 17, typically a microprocessor, but which also may be special-purpose logic.

Data to be printed as a line is stored in a memory 19, which typically is an integral part of data processor 17. Where that data is character data, a six-bit code defining the character is stored for each character along, with the forgoing four-bit density code. Where that data is all-points-addressable graphics data, it is stored in memory 19 in a bit map, meaning that, for example, a binary 1 is stored in memory for each electrode to be driven in a bit position and a binary 0 is stored for each electrode not driven, with those ones and zeros in relative position and in exact number of pels in the line to be printed.

FIG. 2 is a table illustrating the logical or definitional constraints responded to in this embodiment. In the figures, CumRef should be understood as an abbreviation for cumulative reference, a numerical value which is initially zero and which is accumulated in the system and is responded to by the system to reduce print current to a present amount less than initial. FIG. 2 is idealized in its statements of the proportion of heat intensive elements since in practice, as indicated above, the information used in the character mode is approximate. The block status information in FIG. 2 is descriptive only to facilitate understanding of how the printing of the current block is influenced by the prior blocks. This implementation is, in fact, fully defined by the numerical value of the cumulative reference.

As FIG. 2 illustrates, a line is printed by examining the density of heat-intensive bits in separate, adjoining segments or blocks. The initial block and all blocks immediately after a block not printed are printed at a preset, initial power. Blocks after printed blocks are not printed when the cumulative reference for the previous blocks is minus 2 and are printed at reduced power when the cumulative reference for the previous blocks is minus 1.

Where a block printed has an intermediate density of heat-intensive bits, (45% to less than 67% black) the cumulative reference is decreased by 1 unless it is already decreased by 2. Where a block printed has a high density of heat-intensive bits (67% to 100% black), two pass printing is specified and the immediately adjacent block is not printed. Where a block printed has a low density of heat-intensive bits (0% to less than 45% black), the cumulative reference is increased by 1, but never above its initial level. A block printed after the cumulative reference is at minus 1 is printed at a reduced print-power level from initial print level; typically about a 5% to 10% reduction from initial print power. A block printed on the second pass or immediately after skipping of a block is printed at initial power. When printing is resumed in a first pass after skipping a block, another block is not skipped unless print density requires it in accordance with the same constraints as just described.

More specifically, and with specific reference to this preferred embodiment, processor 17 starts with the first data in the line, which will appear in the far left of the typical printed line, and examines the density codes of the block of line data consisting of the first six characters where the data is in character form or data representing the first 0.6 inch of printed matter where the data is in all points addressable (APA) graphics form. For character data the density codes associated with each character in font memory 13 are added. A total of 42 and less than 60 is acted upon to mark the data of the next following block for reduction in print power. Similarly, for the APA mode, total 1's are summed and divided by total pels, and a result establishing 45% and less than 67% is acted upon to mark the data of the next following block for reduction in print power. When the density codes for character data total less than 42 or the proportions of 1's for APA graphics data total less than 45%, the data is marked for an increase to initial print power for the next following block unless this occurs where the print power has not been reduced, in which event print power is not changed. Finally, when the density codes for character data total more than 60 or the proportion of 1's for APA graphics total 67% or more, the data is marked to initiate a two pass printing mode.

The entire data for each line is examined similarly in blocks or segments of six characters or of 0.6 inch, depending on whether the data is in character form or in APA form. Each of the blocks are contiguous and in sequence along the line to be printed. Where the two pass mode is specified by the density codes totaling 60 or the APA having 67 percent heat-intensive pels, the next block is marked for printing on the second pass. Blocks not to be printed on the second pass are examined as described for the initial block. Where the density codes for character data total 42 and less than 60 or where the bit density of APA is between 45% and less than 67%, either the data is marked to initiate a second pass for the following block or, if print power for the current block is not reduced, then the data is marked for decrease in print power for the next following block to be printed.

To further reduce temperature stress in this preferred embodiment, in the APA mode the full 40 electrodes are not used. Instead, 32 contiguous ones of the 40 electrodes are used, and the line feed is adjusted to be 2/15 inch (approximately 0.34 cm) so as to just equal the vertical height of 32 electrodes. This reduces the total overall heating. Computation of bit density is based on the full forty electrodes.

The blocks may be larger than six characters or 0.6 inch where the overall heat-response characteristics of the system permits. Similarly, they may be smaller where this is convenient. Heat density is approximated for character codes, and where convenient, these approximations may be less precise than those of this preferred embodiment. Since approximations are adequate, the differences from different pitches and the like (wide, narrow or proportionally spaced characters), are ignored in this embodiment. Printing in the second pass could advantageously be in the opposite direction from that of the first pass when the printer is capable of bidirectional printing.

Figure 3:
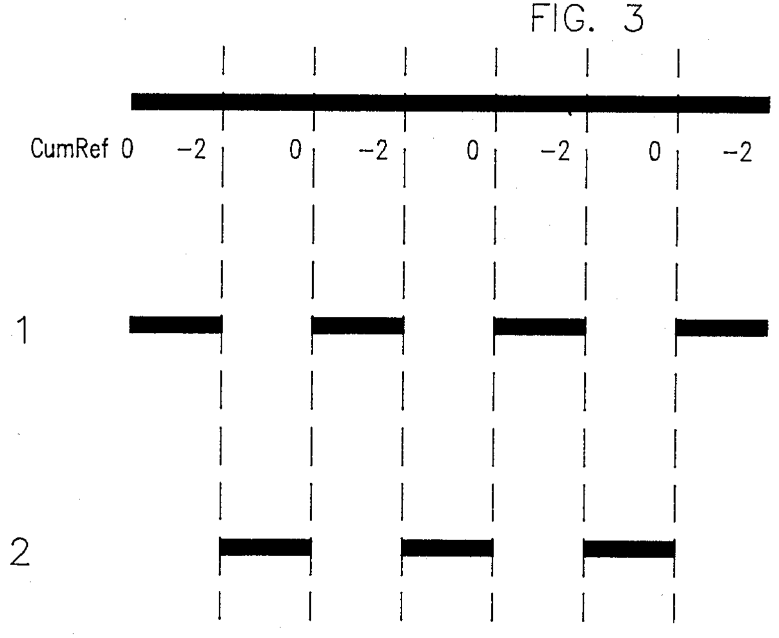
FIG. 3 is illustrative of the printing of an all black line.
Figure 4:
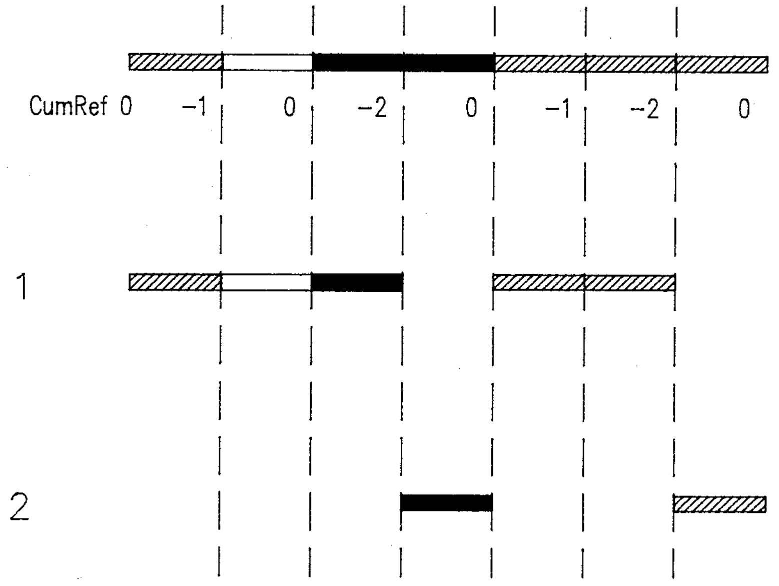
FIG. 4 is illustrative of the printing of line having less than all black.

FIG. 3 shows the printing resulting from the printing of a line, all of which is more that 67% black in bit density (Segments of density of more than 67% black are illustrated as solid black in FIGS. 3 and 4.) The top line illustrates the line to be printed, with the cumulative reference applicable to the printing of each segment or block shown prior to that segment. Because this line is all heavily black, each segment examined results in accumulating a cumulative reference minus two and therefore the next block is skipped. In FIGS. 3 and 4 the first pass is labeled 1 and shown immediately under the illustration of the full line being printed. The second pass is labeled 2 and is at the bottom. In the FIG. 3 illustration, the first block and alternating blocks after the first block are printed in the first pass, while the remaining blocks are printed on a second pass.

FIG. 4 shows the result of the printing of a line (shown at the top) having a first block of intermediate bit density (intermediate is illustrated by crosshatching), a second block of low bit density (low is illustrated as all white), a third block of high bit density, a fourth block (the bit density of which is not significant), a fifth block of intermediate bit density, a sixth block of intermediate bit density, and a seventh block (the bit density of which is not significant). The first block brings the cumulative reference to minus 1. The first two blocks bring the cumulative reference to zero and therefore do not have cumulative bit density calling for a second pass. Those two blocks, as well as the next block, are therefore printed in the first pass. The minus 2 significance of the high-density content of the third block requires a second pass. The fourth block or segment is therefore not printed in the first pass. The next following block is printed and its intermediate density brings the cumulative reference to minus 1. Since the cumulative reference is only minus 1, the next block, (the sixth block) is printed on the first pass. That block (the sixth block) has an intermediate density, thereby lowering the cumulative reference to minus 2 and requiring a second pass. The fourth and seventh blocks are therefore not printed on the first pass and are printed on the second pass.

This invention makes possible efficiencies in ribbon use and speed of printing in systems where the efficiencies can be utilized. One of these is the potential of not feeding ribbon during any skipped block. That would result in essentially the same amount of ribbon being used for two passes as for one. Another is that the second pass may be by return and printing only those blocks not printed in the first pass. This may be as few as one block. In the actual embodiment, overall heating is such that ribbon feed during printing is continued over skipped blocks as this has a cooling effect. Return to only skipped blocks is not known to effect related operation, but must be provided for by appropriate memory and computation or logical capability. A major advantage which is inherent in this invention is that the second pass is completely avoided where the data is such that it is unnecessary.

Various implementations and potential variations of this invention will be apparent, all within the spirit and scope of this invention. In particular, systems permitting a broader range of print power may be implemented by employing more than one predetermined level of print power which is specified by different reductions to the cumulative reference. Thus, when the cumulative reference is brought to minus two, a second print-power level, lower than the level at minus one of the cumulative reference, would be employed, and the two pass would not be initiated, for example, except when the cumulative reference would be brought to minus 3 by the increment resulting from a block. Accordingly, patent protection should be as provided by law, with particular reference to the accompanying claims.

We claim:

1. A thermal printing system having a thermal printhead which produces heat energy for printing by repetitive selective activation of a combination of the individual print elements, each said activation printing only part of characters printed, means to determine from data in a line to be printed the existence of a predetermined high proportion of data for which said elements are activated, and means responsive to said determination of said high proportion to define continuous segments along said line corresponding to a plurality of said characters and to cause printing of alternating ones of said segments first passed across by movement of said printhead along said line, the segments not printed in a first pass of said line being printed in a second pass of said line.

2. The printing system as in claim 1 also comprising means to activate said print elements at an initial power and at at least one power level lower than said initial power, means to examine segments of said data prior to printing to determined a first and a second predetermined proportion of data for which said elements are activated, said first predetermined proportion being less than said second predetermined proportion, means to cause printing at said lower power level when said means to examine determines said first proportion and not said second proportion, and means to cause said printing of alternating segments of data when said means to examine determines said second proportion.

3. The printing system as in claim 2 in which said print elements are in a column perpendicular to said line, said means to determine determines the content of data in segments in the order of magnitude of six-tenth inch along a line being printed and produces one status for data having a high proportion of data for which said elements are activated, a second status for data having an intermediate proportion of data for which said elements are activated, and a third status for data having a low proportion of data for which said elements are activated and in which said means to determine a predetermined high proportion functions by accumulating a balance resulting from each status for contiguous segments all of which are printed, with said one status being accumulated as a factor representing approximately twice the proportion as said second status, and said third status representing approximately the negative of said second status.

4. The printing system as in claim 1 in which said print elements are in a column perpendicular to said line, said means to determine determines the content of data in segments in the order of magnitude of six-tenth inch along a line being printed and produces one status for data having a high proportion of data for which said elements are activated, a second status for data having an intermediate proportion of data for which said elements are activated, and a third status for data having a low proportion of data for which said elements are activated and in which said means to determine a predetermined high proportion functions by accumulating a balance resulting from each status for continuous segments all of which are printed, with said one status being accumulated as a factor representing approximately twice the proportion as said second status, and said third status representing approximately the negative of said second status.

5. The printing system as in claim 4 in which segments printed immediately after segments which are not printed are printed at the initial power level.

6. The printing system as in claim 3 in which segments printed immediately after segments which are not printed are printed at the initial power level.

7. A thermal printing system having elements for thermal printing of only part of characters printed with each activation of said elements, said elements being in a column mounted perpendicular to a line to be printed by said elements by movement along said line, means to examine data to be printed in one of said lines in adjoining continuous segments, each segment comprising substantially all data corresponding to a plurality of said characters along parts of the length of said line, means to accumlate the results of said means to examine, means responsive to said means to accumulate to cause printing of alternating ones of said segments at a predetermined high proportion of data in one or more contiguous segments for which said elements are activated, and means to print segments not printed after said alternating is conducted by passing said print elements over said segments not printed a second time.

8. The printing system as in claim 7 also comprising means to activate said print elements at an initial power and at at least one power level lower than said initial power, and in which said means to examine data determines a first and a second predetermined proportion of data for which said elements are activated, said first predetermined proportion being less than said second predetermined proportion, and also comprising means to cause printing at said lower power level when said means to examine determines said first proportion and not said second proportion, and means to cause said printing of alternating segments of data when said means to examine determines said second proportion.

9. The printing system as in claim 8 in which said segments are in the order of magnitude of six-tenth inch along the length of said line being printed, said means to examine determines for each said segment one status for data having a high proportion of data for which said elements are activated, a second status for data having an intermediate proportion of data for which said elements are activated and a third status for data having a low proportion of data for which said elements are activated and in which said means to accumulate accumulates a balance resulting from each status for contiguous segments all of which are printed, with said one status being accumulated as a factor representing approximately twice the proportion as said second status, and said third status representing approximately the negative of said second status.

10. The printing system as in claim 7 in which said segments are in the order of magnitude of six-tenth inch along the length of said line being printed, said means to examine determines for each said segment one status for data having a high proportion of data for which said elements are activated, a second status for data having an intermediate proportion of data for which said elements are activated and a third status for data having a low proportion of data for which said elements are activated and in which said means to accumulate accumulates a balance resulting from each status for contiguous segments all of which are printed, with said one status being accumulated as a factor representing approximately twice the proportion as said second status, and said third status representing approximately the negative of said second status.

11. The printing system as in claim 10 in which segments printed immediately after segments which are not printed are printed at the initial power level.

12. The printing system as in claim 9 in which segments printed immediately after segments which are not printed are printed at the initial power level.

13. The printing system as in claim 12 in which said print elements are electrodes for applying current to a resistive ribbon.

14. The printing system as in claim 9 in which said print elements are electrodes for applying current to a resistive ribbon.

15. The printing system as in claim 10 in which said print elements are electrodes for applying current to a resistive ribbon.

16. The printing system as in claim 11 in which said print elements are electrodes for applying current to a resistive ribbon.

* * * * *